United States Patent
Siegmeth

(10) Patent No.: US 9,567,086 B2
(45) Date of Patent: Feb. 14, 2017

(54) SYSTEMS AND METHODS FOR SECURING SEATS WITHIN A VEHICLE CABIN

(71) Applicant: The Boeing Company, Chicago, IL (US)

(72) Inventor: Jeff S. Siegmeth, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/489,059

(22) Filed: Sep. 17, 2014

(65) Prior Publication Data
US 2016/0075434 A1    Mar. 17, 2016

(51) Int. Cl.
*B60P 7/08* (2006.01)
*B64D 11/06* (2006.01)

(52) U.S. Cl.
CPC .......... *B64D 11/0696* (2013.01); *B60P 7/0815* (2013.01)

(58) Field of Classification Search
CPC .......................... B60P 7/0815; B64D 11/0696
USPC ........... 410/104, 105, 116; 244/118.1, 188.6, 244/137.1
See application file for complete search history.

(56) References Cited

U.S. PATENT DOCUMENTS

| | | | |
|---|---|---|---|
| 4,026,218 A | 5/1977 | Prete, Jr. | |
| 4,062,298 A * | 12/1977 | Weik | B60P 7/0815 410/105 |
| 4,256,424 A | 3/1981 | Knox | |
| 4,932,816 A * | 6/1990 | Ligensa | B64D 11/0696 410/105 |
| 5,762,296 A | 6/1998 | Gilbert | |
| 7,370,832 B2 * | 5/2008 | Frantz | |
| 2007/0122254 A1 | 5/2007 | LaConte | |

OTHER PUBLICATIONS http://www.attax.com/eng/products/aerofitting.

* cited by examiner

*Primary Examiner* — Stephen Gordon
(74) *Attorney, Agent, or Firm* — Joseph M. Butscher; The Small Patent Law Group, LLC

(57) ABSTRACT

A system for securing seats within a cabin of a vehicle may include at least one seat fitting assembly including at least one seat-mounting member having at least one seat-connecting hole configured to receive at least one fastener that secures a portion of a vehicle seat to the at least one seat-mounting member. The seat-connecting hole(s) is configured to be variably adjusted between a plurality of mounting positions.

20 Claims, 7 Drawing Sheets

SYSTEMS AND METHODS FOR SECURING SEATS WITHIN A VEHICLE CABIN

BACKGROUND OF THE DISCLOSURE

Embodiments of the present disclosure generally relate to systems and methods for positioning and securing seats within a cabin of a vehicle, and, more particularly, to seat fitting assemblies that are configured to position and secure seats within a cabin of a vehicle.

Commercial aircraft typically include numerous rows of seats securely fixed in position within an interior cabin. A first class section, a business class section, and an economy class section may be within the interior cabin. Each section of the aircraft may have rows of seats spaced apart from one another. The rows of the first class section may be spaced apart from each other a first distance. For example, first and second rows of seats within the first class section may be separated by the first distance. Similarly, the rows of the business class section may be spaced apart from each other a second distance, which may be less than the first distance. The rows of the economy class section may be spaced apart from each other a third distance, which may be less than the second distance.

As can be appreciated, aircraft operators seek to maximize seating capacity within a limited cabin space. As seating capacity increases, revenue increases. At the same time, however, passenger comfort is a consideration that is balanced against increased seating capacity. If rows of seats are positioned closer to one another in an attempt to add rows of seats within a cabin, the rows may be too close to comfortably seat at least some passengers (such as those that exceed a particular height). Therefore, aircraft operators understand that there are limits with respect to the distances between adjacent rows of seats.

Individual seats within an aircraft are secured to seat tracks on or within a floor of a cabin. The seat tracks include mounting positions, which may include openings, that are set at a defined pitch or spacing. For example, a typical seat track provides 1" (one inch) spacing between mounting positions. That is, the distance between adjacent mounting positions is 1". Typically, a seat track includes mounting positions or attachment points at 1" intervals so that locations of particular payloads are associated with integer station numbers within the cabin of the aircraft. In this manner, seat pitch may be expressed as an integer.

However, known seat tracks and seat positioning systems and methods are inefficient and often limit configuration options within a cabin of an aircraft. For example, a front row of seats at the front or fore area of an aircraft may be positioned no less than a particular distance from a cockpit, front galley, lavatory, or the like. Similarly, a rear row of seats at the rear or aft area of the aircraft may be positioned no less than a particular distance from a rear structure (such as a divider or barrier wall) or feature (such as an aisleway or an exit door) within the cabin, so that there is a sufficient space therebetween to ensure that the rear structure does not deflect into the rear seats (such as during in-flight air turbulence). Because the rows of seats are spaced in 1" increments, space within the aircraft cabin may be underutilized.

SUMMARY OF THE DISCLOSURE

Certain embodiments of the present disclosure provide a system for securing seats within a cabin of a vehicle. The system may include at least one seat fitting assembly including at least one seat-mounting member having at least one seat-connecting hole configured to receive at least one fastener that secures a portion of a vehicle seat to the seat-mounting member(s). The seat-connecting hole(s) is configured to be variably adjusted between a plurality of mounting positions. For example, seat-connecting holes at different positions on different seat-mounting members may be used. As another example, a single seat-connecting hole may be shifted or otherwise moved by moving a seat-mounting member relative to a base of a single fitting assembly.

The plurality of mounting positions may be separated by fractional distances. For example, the fractional distances may be less than 1". The fractional distances may be fractional or incremental portions of an integer value. The integer value may be a standard spacing (such as 1") between mounting openings of a seat track to which the seat fitting assembl(ies) is configured to secure.

In at least one embodiment, the at least one seat fitting assembly may include first and second seat fitting assemblies. The first and second seat fitting assemblies may include first and second seat-mounting members, respectively, including first and second seat-connecting holes, respectively. The first seat-connecting hole is located at a first location on the first seat-mounting member. The second seat-connecting hole is located at a second location on the second seat-mounting member. The first and second locations differ in relation to a central axis of each of the first and second seat-mounting members. The system may also include third and fourth seat fitting assemblies. The third and fourth fitting assemblies may include third and fourth seat-mounting members, respectively, including third and fourth seat-connecting holes, respectively. The third seat-connecting hole is located at a third location on the third seat-mounting member. The fourth seat-connecting hole is located at a fourth location on the fourth seat-mounting member. The first, second, third, and fourth locations differ in relation to a central axis of each of the first, second, third, and fourth mounting members.

In at least one other embodiment, the at least one seat fitting assembly may include first and second seat fitting assemblies. The first and second seat fitting assemblies may include first and second seat-mounting members, respectively, including first and second seat-connecting holes, respectively. The first seat-mounting member is located at a first distance from a trailing end of the first seat fitting assembly. The second seat-mounting member is located at a second distance from a trailing end of the second seat fitting assembly. The first distance differs from the second distance. The system may also include third and fourth seat fitting assemblies. The third and fourth seat fitting assemblies may include third and fourth seat-mounting members, respectively, including third and fourth seat-connecting holes, respectively. The third seat-mounting member is located at a third distance from a trailing end of the third seat fitting assembly. The fourth seat-mounting member is located at a fourth distance from a trailing end of the fourth seat fitting assembly. The first, second, third, and fourth distances differ from one another.

In at least one embodiment, the at least one seat fitting assembly includes first and second seat fitting assemblies. The first and second seat fitting assemblies may include first and second seat-mounting members, respectively, including first and second seat-connecting holes, respectively. The first seat-mounting member is positioned at a first angle with respect to a base, and the second seat-mounting member is positioned at a second angle with respect to a second base. The first angle differs from the second angle.

In at least one embodiment, the system may include a plurality of inserts. The system may include a plurality of seat-connecting holes. Each of the plurality of inserts has one of the plurality of seat-connecting holes at a different position. A single seat fitting assembly may include a single seat-mounting member defining a channel configured to receive one of the plurality of inserts. The plurality of inserts may be selectively inserted and removed from the channel. The channel may be any shape that is configured to receive an insert having a corresponding shape. For example, if the insert has a circular cross-section, the channel may also have a circular cross-section. The channel may have various other cross-sectional shapes, such as square, pentagonal, hexagonal, heptagonal, octagonal, star-shaped, gear-shaped, and/or the like, depending on the shape of the insert.

In at least one embodiment, a single seat fitting assembly may have a plurality of targets spaced apart from one another. Each of the plurality of targets provides a target for forming the at least one seat-connecting hole.

In at least one embodiment, the at least one seat fitting assembly may include a track-engaging base removably secured to a seat-engaging mount that includes the at least one seat-mounting member. The seat-engaging mount may be selectively moved in relation to the track-engaging base.

Any of the seat fitting assemblies may include at least one position code that indicates the position of a seat-connecting hole. The system may also include at least one seat track having mounting openings regularly spaced at fixed distances. The system may also include an aircraft seat that includes at least one attachment member, such as a foot, that secures to the at least one seat track through the at least one seat fitting assembly.

Certain embodiments of the present disclosure provide a method for securing seats within a cabin of an aircraft. The method may include variably adjusting at least one seat-connecting hole of at least one seat-mounting member of at least one seat fitting assembly between a plurality of mounting positions.

Certain embodiments of the present disclosure provide a seat-securing system configured to be positioned within a cabin of an aircraft. The system may include at least one seat track having mounting openings regularly spaced at fixed 1" distances, and at least one seat fitting assembly including at least one seat-mounting member having at least one seat-connecting hole configured to receive at least one fastener. The seat-connecting hole(s) is configured to be variably adjusted between a plurality of mounting positions. The plurality of mounting positions may be separated by fractional distances that are less than 1". The system may also include an aircraft seat that includes at least one attachment member, such as a foot, that secures to the at least one seat track through the at least one seat fitting assembly.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a system and method of variably spacing seats within a cabin of a vehicle, such as at fractional or incremental pitches or spacings. The vehicle may be an aircraft. Alternatively, the vehicle may be a land-based vehicle, such as a train, bus, or the like, or a water-based vehicle, such as a passenger ship. Embodiments of the present disclosure provide a variable pitch system that may include one or more seat fitting assemblies that include one or more connecting joints, such as seat-mounting members, that are configured to securely connect to a portion of a seat. The one or more connecting joints provide variable mounting positions that may be fractionally or incrementally adjusted. The fractional or incremental adjustments may be with respect to a standard pitch or integer, such as a 1" pitch. In at least one embodiment, the variable mounting positions may be fractionally or incrementally adjusted with respect to the standard pitch. For example, embodiments of the present disclosure provide seat fitting assemblies that may provide mounting positions at increments of 0.5", 0.333", 0.25", 0.20", 0.125", 0.1", etc.

Figure 1:
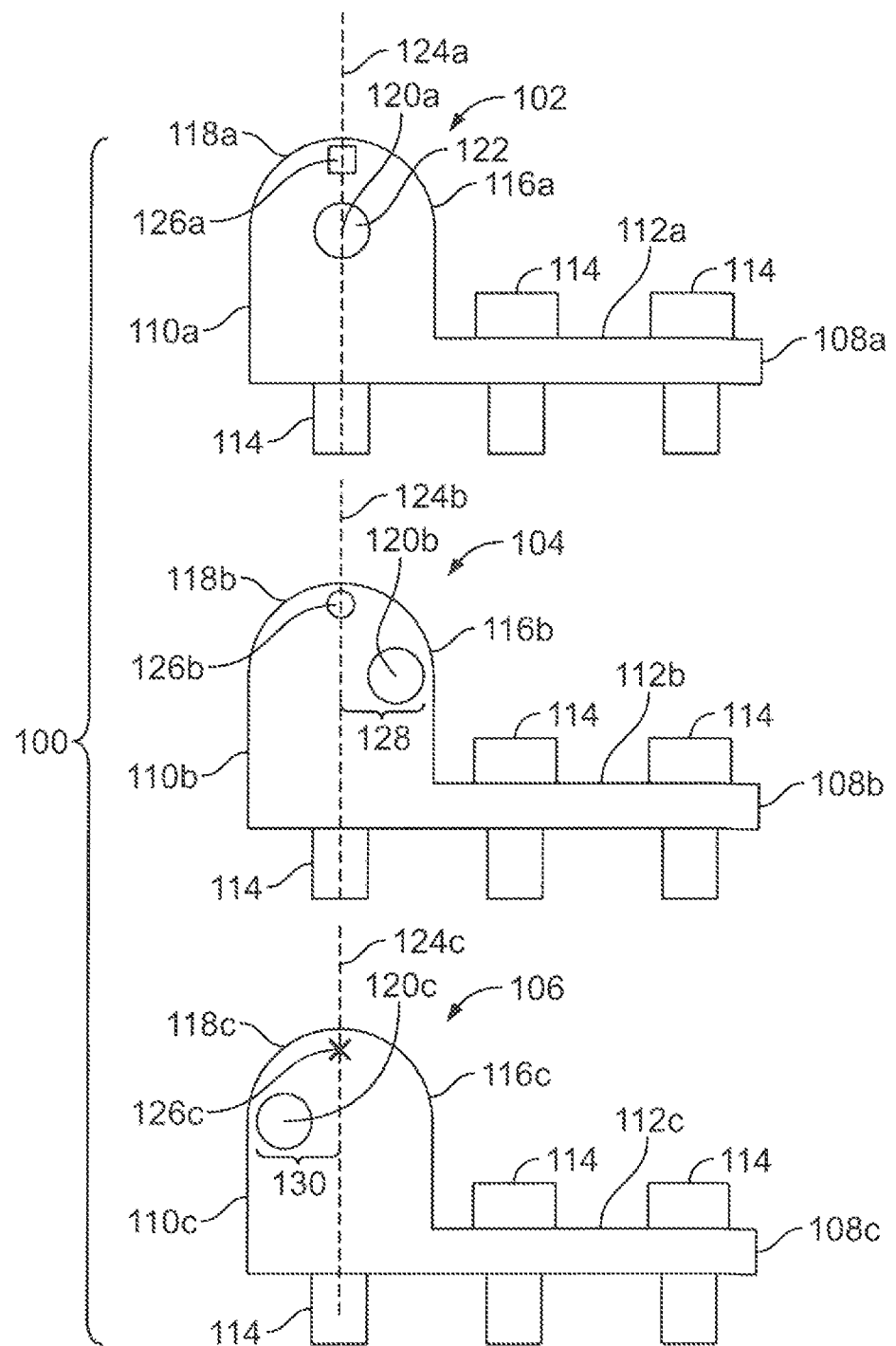
FIG. 1 illustrates a lateral view of a group of seat fitting assemblies that provide variable seat mounting positions, according to an embodiment of the present disclosure.

FIG. 1 illustrates a lateral view of a group 100 of seat fitting assemblies 102, 104, and 106 that provide variable seat mounting positions, according to an embodiment of the present disclosure. The seat fitting assemblies 102, 104, and 106 may be formed of metal, for example. Each seat fitting assembly 102, 104, and 106 includes a base 108a, 108b, and 108c, respectively, integrally connected to a seat-mounting member 110a, 110b, and 110c, respectively, such as a seat connection joint. For example, the seat-mounting members 110, 110b, 110c may be or include lugs, clevises, fins, tabs, or the like.

Each base 108a, 108b, and 108c may include a beam 112a, 112b, and 112c, respectively, that receives and retains one or more fasteners 114, such as screws, bolts, studs, plungers, shear members, or the like. The fasteners 114 are configured to securely connect the seat fitting assemblies 102, 104, and 106 to a seat track (not shown in FIG. 1). As shown in FIG. 1, each seat fitting assembly 102, 104, and 106 is shown having three fasteners 114. Alternatively, more or less fasteners 114 may be used. For example, each seat fitting assembly 102, 104, and 106 may include five fasteners 114.

Each seat-mounting member 110a, 110b, and 110c may be or include a protrusion 116a, 116b, and 116c (such as a panel, beam, or various other simple or complex shapes that may or may not include integral stiffening members), respectively, that upwardly extends from a respective base 108a, 108b, and 108c. The protrusions 116a, 116b, and 116c may include a rounded, arcuate upper edge 118a, 118b, and 118c, respectively. Alternatively, the upper edges 118a, 118b, and 118c may be linear or various other shapes. A seat-connecting hole 120a, 120b, and 120c is formed through each seat-mounting member 110a, 110b, and 110c, respectively, and spans between and through opposed lateral surfaces thereof. The seat-connecting holes 120a, 120b, and 120c are configured to receive and retain a fastener, such as a bolt, pin, stud, or the like, that securely fastens a lower attachment member, such as foot, post, tab, column, or the like, of a seat to the seat-mounting member 110a, 110b, and 110c, respectively.

The seat-connecting holes 120a, 120b, and 120c are positioned at different longitudinal (for example, "fore-aft") positions on the seat-mounting members 110a, 110b, and 110c, respectively. As shown, the seat-connecting hole 120a of the seat-mounting member 110a may be positioned at a central longitudinal position 122 of the seat-mounting member 110a. The central longitudinal position 122 may be at a location that is centered about a central vertical axis 124a of the seat-mounting member 110a. A fastener 114 may be aligned (for example, coaxial) with the central vertical axis 124a. Alternatively, the fastener 114 may not be aligned with the central vertical axis 124a.

While shown as circular holes, the seat-connecting holes 120a, 120b, and 120c (and the seat-connecting holes shown and described with the other embodiments of the present disclosure) may be various other shapes. Each seat-connecting hole 120a, 120b, and 120c may be any shape and/or size that is configured to receive a fastener having an outer portion, such as a shaft, having a reciprocal shape. For example, if the fastener is a cylindrical bolt having a circular cross-section, the seat-connecting hole may also have a circular cross-section. The seat-connecting hole may have various other cross-sectional shapes, such as square, pentagonal, hexagonal, heptagonal, octagonal, star-shaped, and/or the like, depending on the shape of the fastener that is used.

The seat fitting assembly 102 may also include a position code 126a that provides a visual and/or tactile indication of the mounting position of the seat-connecting hole 120a. For example, the position code 126a may be positioned at any outer surface of the seat fitting assembly 102 and may include a distinct color, numeric and/or letter indication, phrase, tactile surface, and/or the like that is unique to the mounting position of the seat-connecting hole 120a. The position code 126 may be provided at or proximate to the top of the seat-mounting member 110a and may provide a readily-discernable indication that the seat fitting assembly 102 is a centered or neutral seat fitting assembly 102. As an example, the position code 126a may be a first color, such as green, that is correlated with the centered or neutral seat fitting assembly 102. In this manner, an individual may quickly and easily determine the nature and mounting position of the seat fitting assembly 102.

In contrast to the seat fitting assembly 102, the seat-connecting hole 120b of the seat-mounting member 110b may be offset or shifted with respect to a central vertical axis 124b of the seat-mounting member 110b. The seat-connecting hole 120b may be rearwardly-offset or shifted a rearward linear distance 128 (which may be parallel to an upper surface of the base 108b) from the central vertical axis 124b. The distance 128 may be a fraction or increment of a standard seat pitch. For example, the distance 128 may be a fraction or increment of an integer value. The distance 128 may be, for example, 0.5", 0.333", 0.25", 0.20", 0.125", or 0.1". Alternatively, the distance 128 may be greater or lesser than those noted.

The seat fitting assembly 104 may also include a position code 126b that provides a visual and/or tactile indication of the mounting position of the seat-connecting hole 120b. For example, the position code 126b may be positioned at any visible outer surface of the seat fitting assembly 104 and may include a distinct color, numeric and/or letter indication, phrase, tactile surface, and/or the like that is unique to the mounting position of the seat-connecting hole 120b. The position code 126b may be provided at or proximate to the top of the seat-mounting member 110b and may provide a readily-discernable indication that the seat fitting assembly 104 is a rearward offset seat fitting assembly 104. As an example, the position code 126b may be a second color, such as red, that is correlated with the rearward offset seat fitting assembly 104. In this manner, an individual may quickly and easily determine the nature and mounting position of the seat fitting assembly 104.

In contrast to the seat fitting assemblies 102 and 104, the seat-connecting hole 120c of the seat-mounting member 110c may be forwardly-offset or shifted with respect to a central vertical axis 124c of the seat-mounting member 110c. The seat-connecting hole 120c may be offset or shifted a forward linear distance 130 (which may be parallel to an upper surface of the base 108c) from the central vertical axis 124c. The distance 130 may be a fraction or increment of a standard seat pitch. For example, the distance 130 may be a fraction or increment of an integer value. The distance 130 may be, for example, 0.5", 0.333", 0.25", 0.20", 0.125", or 0.1". Alternatively, the distance 130 may be greater or lesser than those noted.

The seat fitting assembly 106 may also include a position code 126c that provides a visual and/or tactile indication of the mounting position of the seat-connecting hole 120c. For example, the position code 126c may be positioned at any visible outer surface of the seat fitting assembly 106 and may include a distinct color, numeric and/or letter indication, phrase, tactile surface, and/or the like that is unique to the mounting position of the seat-connecting hole 120c. The position code 126c may be provided at or proximate to the top of the seat-mounting member 110c and may provide a readily-discernable indication that the seat fitting assembly 106 is a forward offset seat fitting assembly 106. As an example, the position code 126c may be a third color, such as yellow, that is correlated with the forward offset seat fitting assembly 106. In this manner, an individual may quickly and easily determine the nature and mounting position of the seat fitting assembly 106.

In operation, the group 100 may be used to mount seats within a cabin of an aircraft at variable positions. For example, the seat fitting assembly 102 may be used to position a seat within a cabin at a central or neutral position. If, however, it is desired to position the seat at a fractional or incremental position rearward or forward from the central or neutral position, the seat fitting assembly 104 or the seat fitting assembly 106 may be used. The seat fitting assemblies 102, 104, and 106 may all be sized and shaped in a similar fashion, and may all secure to seat tracks in the same way and position. However, the different locations of the seat-connecting holes 120a, 120b, and 120c allow for variable incremental positioning of the seats within the cabin. The position codes 126a, 126b, and 126c provide an individual with a readily-discernable indication of the type of seat fitting assembly 102, 104, and 106, thereby allowing the individual to quickly and easily choose the desired seat fitting assembly 102, 104, or 106.

As shown in FIG. 1, the seat-mounting members 110a, 110b, and 110c may be positioned at an end of the seat fitting assemblies 102, 104, and 106, respectively. Alternatively, the seat-mounting members 110a, 110b, and 110c may be positioned at an opposite end, at or proximate a middle, or any other point between the ends.

Further, the group 100 may include more or less than three separate and distinct seat fitting assemblies 102, 104, and 106, each having a seat-connecting hole at a different mounting position. For example, the group 100 may include four or more seat fitting assemblies each having a different seat-connecting hole location. Also, the fractional or incremental spacing of the seat-connecting holes may be greater or lesser than those described. For example, the group may include a first seat fitting assembly having a seat-connecting hole at a central location, a second seat fitting assembly having a seat-connecting hole at 0.25" inch forward from a central vertical axis of a seat-mounting member, a third seat fitting assembly having a seat-connecting hole at 0.25" rearward from a central vertical axis of a seat-mounting member, a fourth seat fitting assembly having a seat-connecting hole at 0.5" inch forward from a central vertical axis of a seat-mounting member, a fifth seat fitting assembly having a seat-connecting hole at 0.5" rearward from a central vertical axis of a seat-mounting member, and so on.

In short, the group 100 provides a plurality of seat fitting assemblies each having a different mounting position. The plurality of seat fitting assemblies are configured to provide seat mounting positions at a plurality of incremental or fractional positions in relation to a standard pitch or spacing, such as a standard 1" pitch or spacing. The position of the seat-connecting hole of at least one of the seat fitting assemblies allows for mounting of aircraft seats at a non-integer position (such as a non-integer position in relation to a 1" integer pitch) within a cabin of an aircraft.

Figure 2A:
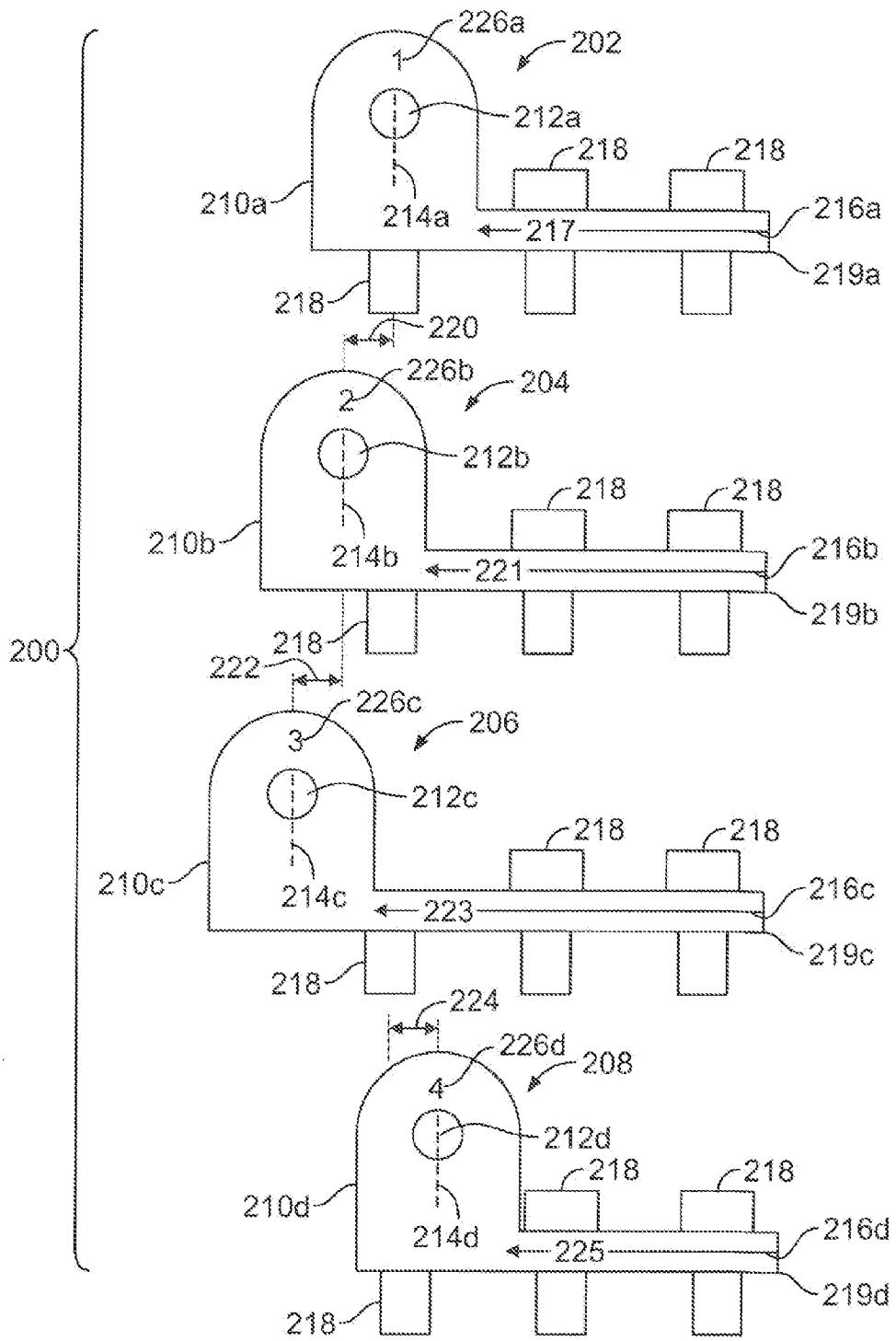
FIG. 2A illustrates a lateral view of a group of seat fitting assemblies that provide variable seat mounting positions, according to an embodiment of the present disclosure.

FIG. 2A illustrates a lateral view of a group 200 of seat fitting assemblies 202, 204, 206, and 208 that provide variable seat mounting positions, according to an embodiment of the present disclosure. The seat fitting assemblies 202, 204, 206, and 208 are similar to those described above, except that seat-mounting members 210a, 210b, 210c, and 210d include seat-connecting holes 212a, 212b, 212c, and 212d that may all be aligned with respective central vertical axes 214a, 214b, 214c, and 214d. That is, the seat-connecting holes 212a, 212b, 212c, and 212d may all be positioned at the same positions with respect to the central vertical axes 214a, 214b, 214c, and 214d, respectively. The locations of the seat-connecting holes 212a, 212b, 212c, and 212d differ from one another by the location of the seat-mounting members 210a, 210b, 210c, and 210d in relation to respective bases 216a, 216b, 216c, and 216d. The location of fasteners 218 for each of the seat fitting assemblies 202, 204, 206, and 208 may be the same. That is, the locations of the three fasteners 218 for each seat fitting assembly 202, 204, 206, and 208 may be at the same distances with respect to one another.

The seat-mounting member 210b may be shifted or offset a rearward distance 220 in relation to the seat-mounting member 210a. The distance 220 may be any of the fractional or incremental distances described above. As such, the seat fitting assembly 204 may be longer than the seat fitting assembly 202.

The seat-mounting member 210c may be shifted or offset a rearward distance 222 in relation to the seat-mounting member 210b. The distance 222 may be any of the fractional or incremental distances described above. As such, the seat fitting assembly 206 may be longer than the seat fitting assembly 204. Alternatively, the length may remain the same, but the protrusions may be canted, for example, as shown and described with respect to FIG. 2B.

The seat-mounting member 210d may be shifted or offset a forward distance 224 in relation to the seat-mounting member 210a. The distance 224 may be any of the fractional or incremental distances described above. As such, the seat fitting assembly 208 may be shorter than the seat fitting assembly 202.

As shown in FIG. 2A, the seat-mounting member 210a extends from a position along the base 216a that is a distance 217 from a trailing end 219a of the seat fitting assembly 202. Similarly, the seat-mounting member 210b extends from a position along the base 216b that is a distance 221 from a trailing end 219b of the seat fitting assembly 204. The seat-mounting member 210c extends from a position along the base 216c that is a distance 223 from a trailing end 219c of the seat fitting assembly 206. The seat-mounting member 210d extends from a position along the base 216d that is a distance 225 from a trailing end 219d of the seat fitting assembly 208. The distances 217, 221, 223, and 225 may all differ from one another. For example, the distance 225 may be X. The distance 217 may be X+0.25". The distance 221 may be X+0.50". The distance 223 may be X+0.75". Various other fractional distances may be used. It is to be understood that the trailing ends described above may be leading ends, depending on the orientation of the seat fitting assemblies within a cabin of an aircraft. The term "trailing end" is merely used with respect to the orientation shown in the drawings and with respect to an arbitrary right-to-left orientation. Recitation of the trailing end does not, however, preclude the ends 219a, 219b, 219c, and 219d from being secured in relation toward a front or rear portion of a seat track and/or seat. For example, the ends 219a, 219b, 219c, and 219d may be leading ends.

Each of the seat fitting assemblies 202, 204, 206, and 208 may include a unique position code 226a, 226b, 226c, and 226d, respectively, that particularly identifies the mounting location of respective seat-connecting holes 212a, 212b, 212c, and 212d. The position codes 226a, 226b, 226c, and 226d are shown as numeric values in FIG. 2A, but it is to be understood that the position codes 226a, 226b, 226c, and 226d may be various other types of position codes, such as any of those described above.

As shown in FIG. 2A, the group 200 may include four separate and distinct seat fitting assemblies 202, 204, 206, and 208, each of which provides a seat-connecting hole 212a, 212b, 212c, and 212d, respectively, at a different location (such as a different fractional or incremental location). Alternatively, the group 200 may include more or less seat fitting assemblies than shown, providing additional or less seat mounting locations.

Figure 2B:
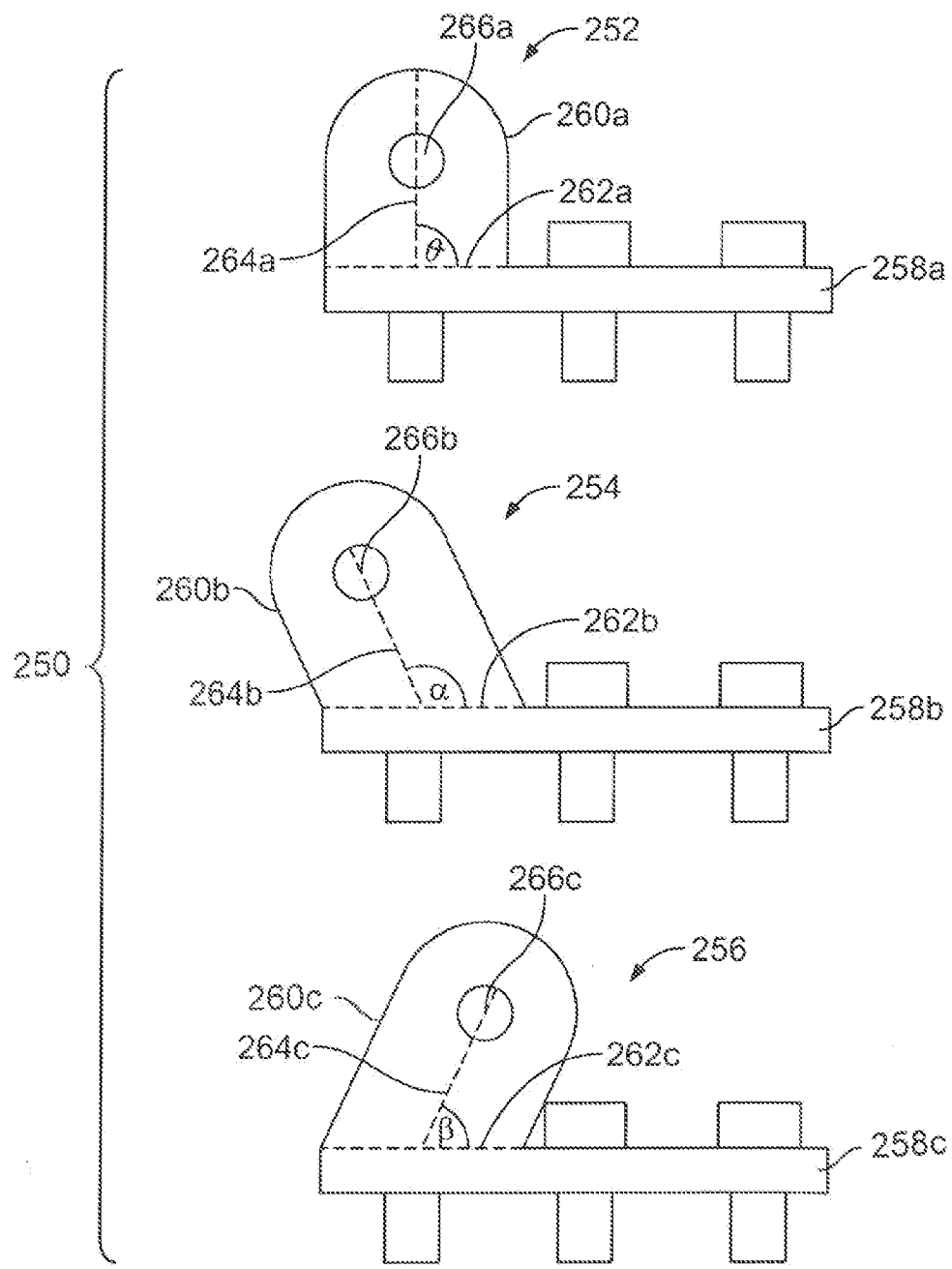
FIG. 2B illustrates a lateral view of a group of seat fitting assemblies that provide variable seat mounting positions, according to an embodiment of the present disclosure.

FIG. 2B illustrates a lateral view of a group 250 of seat fitting assemblies 252, 254, and 256 that provide variable seat mounting positions, according to an embodiment of the present disclosure. The seat fitting assemblies 252, 254, and 256 are similar to those described with respect to FIG. 2A, except that the length of each respective base 258a, 258b, and 258c is the same, while the respective seat-mounting members 260a, 260b, and 260c are each angled at a different position with respect to planes of respective upper surfaces 262a, 262b, and 262c of each respective base 258a, 258b, and 258c. For example, a central vertical axis 264a of the seat mounting member 260a may be at an angle θ, which may be a right angle, with respect to the plane of the upper surface 262a. In contrast, the central vertical axis 264b of the seat mounting member 260b may be at an angle α, which may be an obtuse angle, with respect to the plane of the upper surface 262b. The central vertical axis 264c of the seat mounting member 260c may be at an angle β, which may be an acute angle, with respect to the plane of the upper surface 262c. Each of the angles θ, α, and β may be different. As such, the angled or canted seat mounting members 260a, 260b, and 260c each position respective seat-connecting holes 266a, 266b, and 266c at different longitudinal (fore-aft) positions in relation to the respective bases 258a, 258b, and 258c. The different positions of the seat-connecting holes 266a, 266b, and 266c may be different fractional or incremental positions, as described above.

The group 250 is shown having three separate and distinct seat fitting assemblies 252, 254, and 256. It is to be understood, however, that the group 250 may include more or less seat fitting assemblies than shown. For example, the group 250 may include four separate and distinct seat fitting assemblies, each of which positions a respective seat-connecting hole at a different fractional or incremental position. Additionally, each of the seat fitting assemblies 252, 254, and 256 may include a unique position code, as described above.

Figure 3:
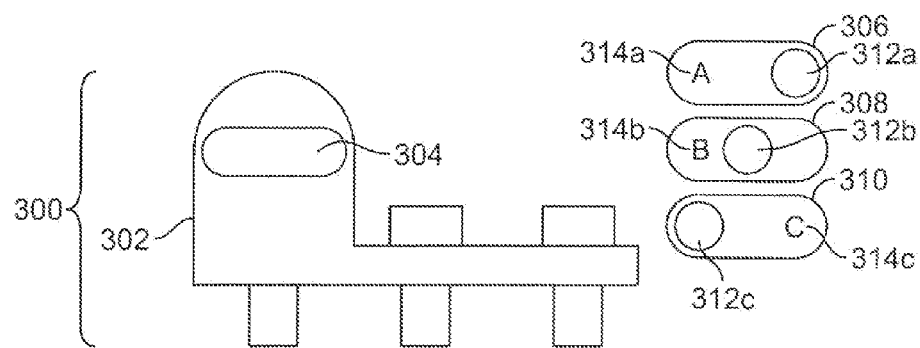
FIG. 3 illustrates a lateral view of a seat fitting assembly that provides variable seat mounting positions, according to an embodiment of the present disclosure.

FIG. 3 illustrates a lateral view of a seat fitting assembly 300 that provides variable seat mounting positions, according to an embodiment of the present disclosure. The seat fitting assembly 300 includes a seat-mounting member 302, similar to those described above. A channel 304 is formed through the seat-mounting member 302. The channel 304 is generally larger than a seat-connecting hole that is configured to receive a fastener that secures an attachment member, such as a foot, of a seat to the seat fitting assembly 300. The channel 304 is configured to receive and retain one of a plurality of inserts 306, 308, and 310. Each insert 306, 308, and 310 may be a metal or plastic bushing that is configured to be removably secured within the channel 304.

Each of the inserts 306, 308, and 310 includes a seat-connecting hole 312a, 312b, and 312c at a different position. The seat-connecting hole 312b may be shifted or offset a fractional or incremental forward distance in relation to the seat-connecting hole 312a. The seat-connecting hole 312b may be at or proximate to the center of the insert 308. The seat-connecting hole 312c may be shifted or offset a fractional or incremental forward distance in relation to the seat-connecting hole 312b. The seat-connecting hole 312c may be at or proximate to one end of the insert 310, while the seat-connecting hole 312a may be at or proximate to an opposite end of the insert 306.

In operation, an individual may insert a particular insert 306, 308, or 310 into the channel 304 to provide a desired spacing. As such, a single seat fitting assembly 300 having multiple inserts 306, 308, 310, which may be selectively secured within the channel 304, may be used to provide variable incremental or fractional mounting positions for a seat within a cabin of an aircraft. Moreover, the inserts may be reversible so as to achieve a greater number of possible locations and/or a fewer number of parts.

Each of the inserts 306, 308, and 310 may include a unique position code 314a, 314b, and 314c, respectively, that particularly identifies the mounting location of respective seat-connecting holes 312a, 312b, and 312c. The position codes 314a, 314b, and 314c are shown as letter values in FIG. 3, but it is to be understood that the position codes 314a, 314b, and 314c may be various other types of position codes, such as any of those described above.

As shown in FIG. 3, the seat fitting assembly 300 may include three separate and distinct inserts 306, 308, and 310, each of which provides a seat-connecting hole 312a, 312b, and 312c, respectively, at a different location (such as a different fractional or incremental location). Alternatively, the seat fitting assembly 300 may include more or less inserts than shown, providing additional or fewer seat mounting locations.

While the channel 304 is shown as a linear shape with curved ends, and the inserts 306, 308, and 310 are shown as similar shapes, it is to be understood that the shapes and sizes of the inserts and the channel may be various other shapes and sizes. For example, the inserts may alternatively be shaped as squares, rectangles, polygons, irregularly-shaped objects, gears, stars, and the like. Further, each of the inserts may include one or more anti-rotation members, such as barbs, studs, or the like, extending therefrom that are configured to be retained by corresponding features formed in the seat fitting assembly 300.

Figure 4:
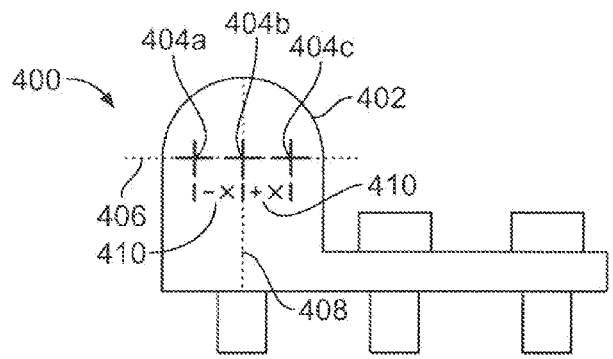
FIG. 4 illustrates a lateral view of a seat fitting assembly that provides variable seat mounting positions, according to an embodiment of the present disclosure.

FIG. 4 illustrates a lateral view of a seat fitting assembly 400 that provides variable seat mounting positions, according to an embodiment of the present disclosure. The seat fitting assembly 400 includes a seat-mounting member 402, which is similar to those described above, except that a seat-connecting hole is not initially formed through the seat-mounting member 402. Instead, the seat-mounting member 402 includes a plurality of targets 404a, 404b, and 404c along a line 406 that is perpendicular to a central vertical axis 408 of the seat-mounting member 402. The targets 404a, 404b, and 404c provide locations where a seat-connecting hole may be formed, such as through use of a drill, at a desired fractional or incremental pitch. The targets 404a, 404b, and 404c may be actual markings on the seat fitting assembly 400. In at least one other embodiment, the targets 404a, 404b, and 404c may be structural features, such as divots, indentations, cavities, pilot holes, or the like, formed on the seat fitting assembly. Alternatively, the targets 404a, 404b, and 404c may be virtual or unmarked recommendations. The seat-mounting member 402 may include position codes 410, such as numeric gradations, that indicate the fractional distance or pitch from a center location, for example, for each of the targets 404a, 404b, and 404c. The seat-mounting member 402 may include more or less targets than shown.

Notably, the seat fitting assembly 400 may initially be devoid of a seat-connecting hole. Instead, the targets 404a, 404b, and 404c provide various positions where a seat-connecting hole may be formed at a particular fractional pitch location. In this manner, a plurality of the same seat fitting assemblies 400 may be stocked and later formed to provide seat-connecting holes at various fractional pitch or spacing locations.

Figure 5:
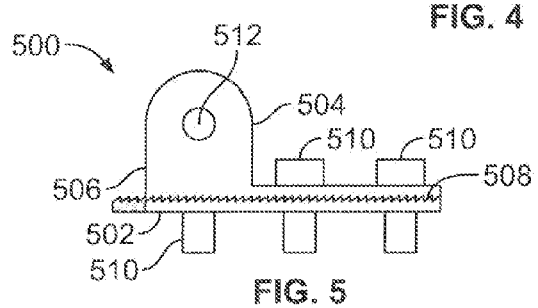
FIG. 5 illustrates a lateral view of a seat fitting assembly that provides variable seat mounting positions, according to an embodiment of the present disclosure.

FIG. 5 illustrates a lateral view of a seat fitting assembly 500 that provides variable seat mounting positions, according to an embodiment of the present disclosure. The seat fitting assembly 500 includes a lower track-engaging base 502 removably secured to an upper seat-engaging mount 504. The seat-engaging mount 504 includes a seat-mounting member 506 that is configured to connect to a seat-mounting feature, such as a fastener, or the like. The track-engaging base 502 connects to the seat-engaging mount 504 through a separable interface 508. The tracking-engaging base 502 secures to the seat-engaging mount 504 through one or more fasteners, such as the fasteners 510, which may also be used to secure the seat fitting assembly 500 to a seat track. In order to adjust a position of a seat-connecting hole 512 formed through the seat-mounting member 506, the fasteners 510 may be removed, and the seat-engaging mount 504 removed from the track-engaging base 502. The seat-engaging mount 504 may be shifted a fractional or incremental distance with respect to the track-engaging base 502, and the fasteners 510 may be used to secure the components together.

Figure 6:
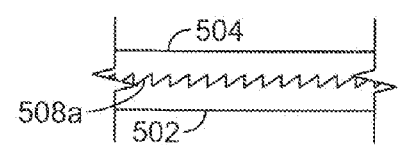
FIG. 6 illustrates a lateral view of a separable interface, according to an embodiment of the present disclosure.

FIG. 6 illustrates a lateral view of a separable interface 508a, according to an embodiment of the present disclosure. The separable interface 508a may be a regular and repeating sawtooth interface between the track-engaging base 502 and the seat-engaging mount 504. The sawtooth interface provides a locking mechanical interface that reduces the risk of the seat-engaging mount 504 sliding on, over, or with respect to the track-engaging base 502, or vice versa.

Figure 7:
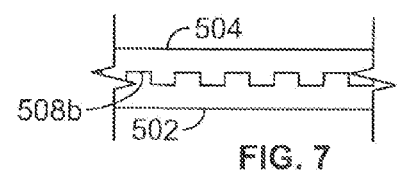
FIG. 7 illustrates a lateral view of a separable interface, according to an embodiment of the present disclosure.

FIG. 7 illustrates a lateral view of a separable interface 508b, according to an embodiment of the present disclosure. The separable interface 508b may be a regular and repeating square or block interface between the track-engaging base 502 and the seat-engaging mount 504. The square or block interface provides a locking mechanical interface that reduces the risk of the seat-engaging mount 504 sliding on, over, or with respect to the track-engaging base 502, or vice versa.

Figure 8:
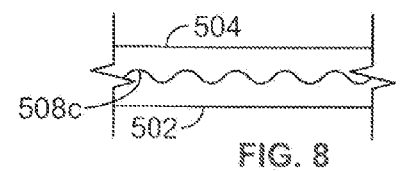
FIG. 8 illustrates a lateral view of a separable interface, according to an embodiment of the present disclosure.

FIG. 8 illustrates a lateral view of a separable interface 508c, according to an embodiment of the present disclosure. The separable interface 508c may be regular and repeating arcuate interface between the track-engaging base 502 and the seat-engaging mount 504. The arcuate interface provides a locking mechanical interface that reduces the risk of the seat-engaging mount 504 sliding on, over, or with respect to the track-engaging base 502, or vice versa.

Referring to FIGS. 5-8, the separable interface 508 may include a regular pattern that repeats at a regular distance. For example, the distance between peaks of the sawtooth pattern shown in FIG. 6 may be a desired incremental or fractional distance, such as 0.25", for example. In this manner, the separable interface 508 allows the seat fitting assembly 500 to be separated and secured together at variable positions so that the seat-connecting hole 512 may be moved a corresponding fractional or incremental distance.

Although the separable interface 508 is shown proximate to the track-engaging base 502, it is to be understood that the separable interface 508 may be at various other locations of the seat fitting assembly 500. The separable interface 508 may be positioned in various other positions and orientations between the track-engaging base 502 and the seat-engaging mount 504.

Figure 9:
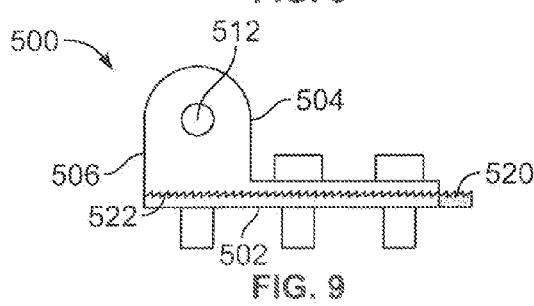
FIG. 9 illustrates a lateral view of a seat fitting assembly in which a seat-engaging mount is shifted with respect to a track-engaging base, according to an embodiment of the present disclosure.

FIG. 9 illustrates a lateral view of the seat fitting assembly 500 in which the seat-engaging mount 504 is shifted with respect to the track-engaging base 502, according to an embodiment of the present disclosure. Upper surfaces 520 of the track-engaging base 502 and lower surfaces 522 of the seat-engaging mount 504 may include position codes to indicate the incremental or fractional position of the seat-connecting hole 512. For example, the upper and lower surfaces 520 and 522 respectively may be color coded various colors to indicate the position of the seat-connecting hole 512 in relation to the track-engaging base 502. Alternatively, the position codes may include numerical gradations, for example.

Figure 10:
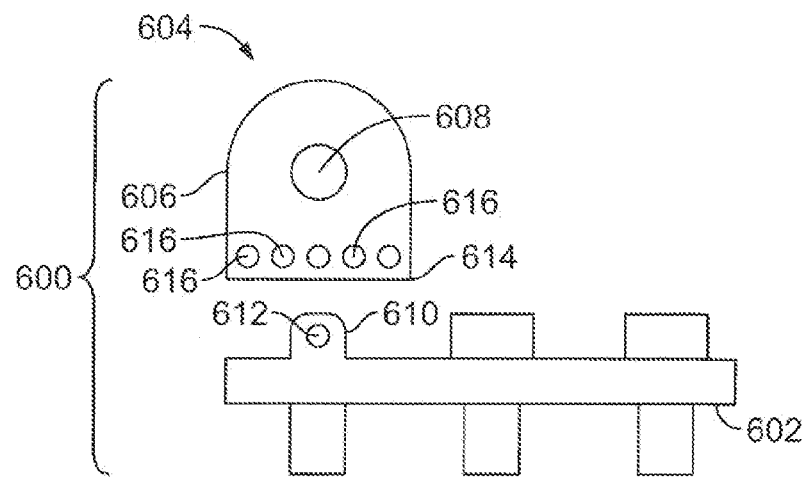
FIG. 10 illustrates a lateral view of a seat fitting assembly, according to an embodiment of the present disclosure.

FIG. 10 illustrates a lateral view of a seat fitting assembly 600, according to an embodiment of the present disclosure. The seat fitting assembly 600 includes a lower track-engaging base 602 that is configured to removably secure to an upper seat-engaging mount 604, which includes a seat-mounting member 606 having a seat-connecting hole 608. The track-engaging base 602 may include at least one upwardly-extending fastener tab 610 defining at least one fastener through-hole 612. The fastener tab 610 is separated by a space into which a lower edge 614 of the seat-engaging mount 604 is to be positioned. The lower edge 614 includes a plurality of fastener through-holes 616 spaced apart from one another at incremental or fractional distances. The seat-engaging mount 604 may be positioned at various positions with respect to the track-engaging base 602 by aligning a particular fastener through-hole 616 with a fastener through-hole 612 of the fastener tab 610 and positioning a fastener, such as a bolt, therethrough, in order to secure the seat-engaging mount 604 to the track-engaging base 602 at a desired position. In this manner, the seat-connecting hole 608 may be located at various incremental or fractional positions in relation to the track-engaging base 602.

As shown in FIG. 10, the seat-engaging mount 604 may include five fastener through-holes 616. As such, the seat-engaging mount 604 may be positioned at five different positions with respect to the track-engaging base 602. Alternatively, the seat-engaging mount 604 may include more or less than five fastener through-holes 616. Neighboring fastener through-holes 616 may be separated by a distance such as any of the incremental or fractional distances described above.

Additionally, the track-engaging base 602 may include more seat-fastener tabs 610 than shown. Further, the fastener tabs 610 may be various other structures, components, or the like other than tabs extending upwardly from either side of the track-engaging base 602. For example, instead of the fastener tabs 610 shown, notched reciprocal guide tracks, latches, hooks, barbs, clasps, and the like may be used to selectively secure the seat-engaging mount 604 to the track-engaging base 602 at variable positions.

Figure 11:
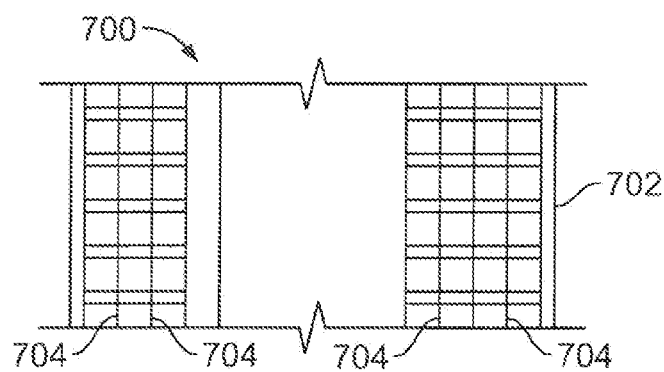
FIG. 11 illustrates a top plan view of a portion of a cabin of an aircraft, according to an embodiment of the present disclosure.

FIG. 11 illustrates a top plan view of a portion of a cabin 700 of an aircraft 702, according to an embodiment of the present disclosure. The cabin 700 includes a plurality of seat tracks 704 that run parallel with one another from a front to rear portion of the cabin 700. Rows of seats (not shown in FIG. 11) are configured to securely mount to the seat tracks 704 through seat fitting assemblies, such as any of those described above. While seat tracks that extend from a fore end to an aft end are shown, it is to be understood that the seat tracks may also be angled with respect to the cabin 700. For example, the seat tracks may be angled with respect to a tapered portion of the cabin 700.

Figure 12:
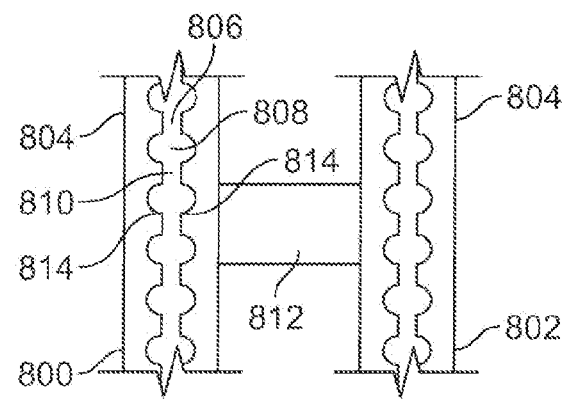
FIG. 12 illustrates a top plan view of seat tracks, according to an embodiment of the present disclosure.

FIG. 12 illustrates a top plan view of seat tracks 800 and 802, according to an embodiment of the present disclosure. Each of the seat tracks 800 may include a metal bracket 804 having a central track 806 that includes mounting openings, such as circular stud-receiving openings 808 connected together through linear channels 810. The circular stud-receiving openings 808 are evenly and regularly spaced at fixed integer distances (that is, non-fractional or non-incremental), such as 1" distances. As shown, parallel seat tracks 800 and 802 may be connected together by braces 812. In order to secure a seat fitting assembly into the seat track, the fasteners, such as studs, extending from a base of the seating assembly may be aligned with the stud-receiving openings 808. The fasteners are then inserted into the openings 808, and may then be shifted into the linear channels 810 so that they are trapped underneath ledges 814 of the brackets 804 that define the channels 810. Plungers or other fasteners of the seat fitting assembly may then be engaged to securely fix the seat fitting assembly in position.

Alternatively, the seat tracks 800 and 802 may not include the channels 810 connecting the openings 808. Instead, the seat tracks 800 may include circular openings that receive and retain fasteners of a seat fitting assembly. Also, alternatively, the seat tracks may be a wide range of cross-sections, including an I-cross section, a Pi cross section, and the like.

Figure 13A:
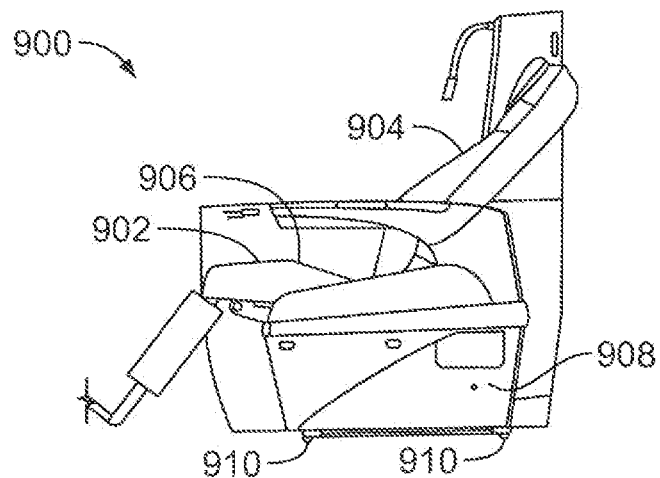
FIG. 13A illustrates a lateral view of an aircraft seat, according to an embodiment of the present disclosure.

FIG. 13A illustrates a lateral view of an aircraft seat 900, according to an embodiment of the present disclosure. The aircraft seat 900 includes a lower support 902 and a backrest 904. The lower support 902 includes a seat surface 906 and a base 908 having attachment members 910, such as feet, columns, studs, posts, fins, or the like. The attachment members 910 are configured to securely mount to seat-mounting members of seat fitting assemblies, which, in turn, secure to seat tracks. For example, each attachment member 910 may include a fastener through hole that is configured to align with a seat-connecting hole of a seat mounting member of a seat fitting assembly. A fastener, such as bolt, is positioned through the aligned holes to secure the attachment member 910 (and therefore the aircraft seat 900) to the seat fitting assembly.

Figure 13B:
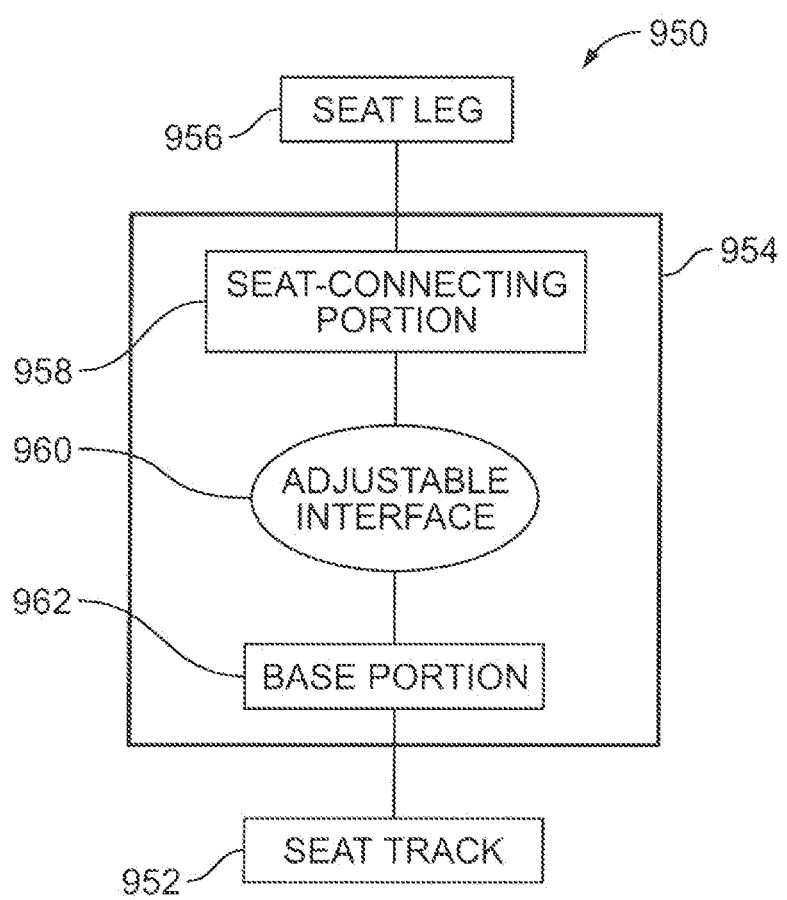
FIG. 13B illustrates a simplified block diagram of an aircraft seat secured to a seat track through a seat fitting assembly, according to an embodiment of the present disclosure.

FIG. 13B illustrates a simplified block diagram of an aircraft seat 950 secured to a seat track through a seat fitting assembly 954, according to an embodiment of the present disclosure. The aircraft seat 950 may include an attachment member 956, such as a distal portion of a seat leg, which connects to a seat-connecting portion 958 of the seat fitting assembly 954. The seat-connecting portion 958 may be any of the seat-connecting members described above. The seat-connecting portion 958 may be connected to an adjustable interface 960, which allows the seat fitting assembly 954 to be variably adjusted among a plurality of fractional or incremental positions. The seat fitting assembly 954 also includes a base portion 962 that secures to the seat track 952.

Figure 14:
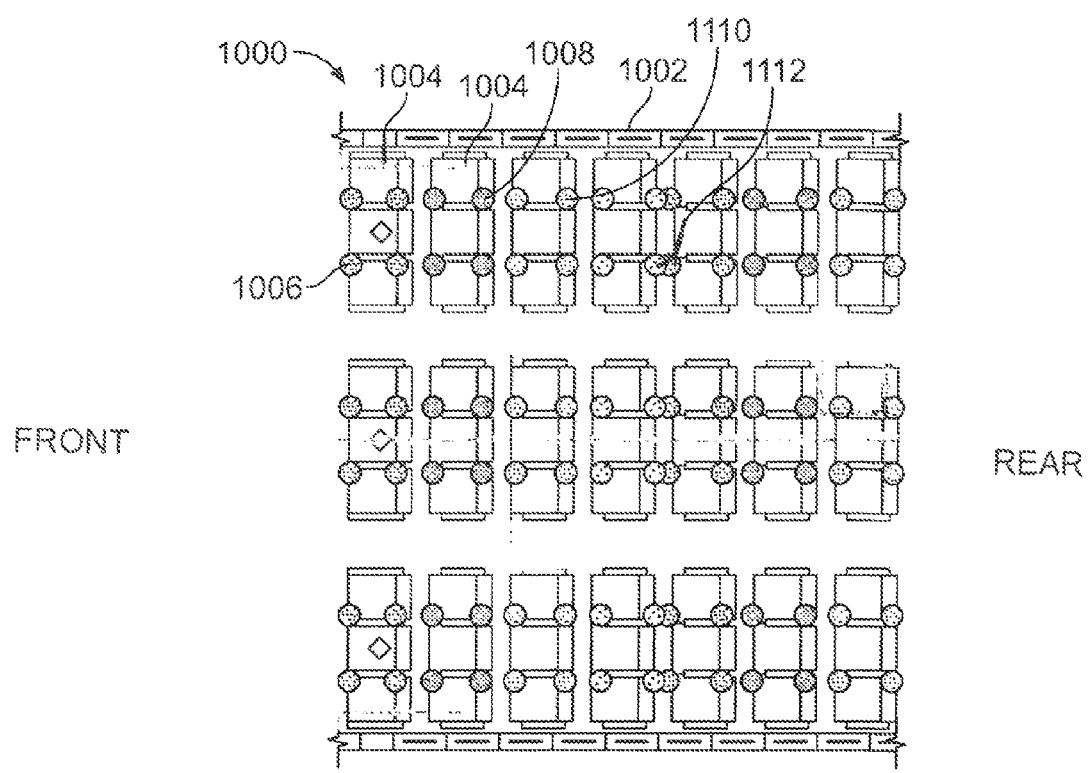
FIG. 14 illustrates a top plan view of a portion of a cabin of an aircraft, according to an embodiment of the present disclosure.

FIG. 14 illustrates a top plan view of a portion of a cabin 1000 of an aircraft 1002, according to an embodiment of the present disclosure. For the sake of clarity, the front and rear of the aircraft 1002 are indicated in FIG. 14. The cabin 1000 may include rows of seats 1004 secured to seat tracks (hidden from view) through seat fitting assemblies (hidden from view). The seat tracks may include separate and distinct codes 1006, 1008, 1110, and 1112, such as different colors, that provide an indication as to the type of seat fitting assembly to use in order to provide a desired number of seats 1004 at desired distances from one another. Accordingly, an individual may inspect the cabin 1000 for proper installation or position of the seats 1004 by conferring with the proper coding of seat fitting assemblies and/or proper coding of seat tracks.

For example, the spacing between the rows of seats 1004 proximate the front of the cabin 1000 may be at a first spacing or pitch, such as 36", while the rows of seats 1004 proximate the rear of the cabin 1000 may be a second spacing or pitch, such as 31". The seat fitting assemblies described above allow the pitch or spacing between the rows of seats to gradually decrease from the first row to the last row. For example, the spacing or pitch between neighboring rows may decrease 0.25". As an example, the spacing or pitch between the first and second rows may be 36". The spacing or pitch between the second and third rows may be 35.75", and so on.

With prior seat fittings, seats could be adjusted with respect to a standard 1" pitch. Accordingly, if an aircraft included twenty-eight rows of seats, even if each row were adjusted to be once inch closer to the front of the aircraft, a space savings of 28" would result. However, 28" may not provide sufficient space to comfortably seat an additional row of passengers. Embodiments of the present disclosure, however, allow seats to be adjusted incrementally. For example, embodiments of the present disclosure allow each of the 28 rows of seats to be moved forward 1.25", 1.5", etc. closer to the front of the aircraft. If each row of seats is adjusted 1.25" forward, for example, a space savings of 35" results (28 rows*1.25"), which is generally large enough to add another row of seats to the aircraft. Accordingly, by allowing for incremental adjustments, the embodiments of the present disclosure allow for aircraft operators to take advantage of additional space within an aircraft to add more seats, and therefore generate more revenue.

Referring to FIGS. 1-14, embodiments of the present disclosure provide one or more seat fitting assemblies that allow seats to be secured to seat tracks within a cabin of an aircraft at various positions. For example, the seats may be positioned at fractional or incremental positions in relation to a standard pitch or spacing as dictated by the seat tracks. In this manner, additional seats may be positioned within an aircraft.

Certain embodiments of the present disclosure provide a method for securing seats within a cabin of an aircraft. The method may include variably adjusting at least one seat-connecting hole of at least one seat-mounting member of at least one seat fitting assembly between a plurality of mounting positions. The plurality of mounting positions may be separated by fractional distances. The fractional distances may be less than 1", for example.

Embodiments of the present disclosure provide seat fitting assemblies that provide a customizable, modular system and method for installing and securing seats within a cabin of an aircraft. Embodiments of the present disclosure provide seat fitting assemblies that provide variable seat pitch or mounting positions. For example, the seat fitting assemblies may provide fractional mounting positions of 0.1", 0.25", 0.333", 0.5", etc. Embodiments of the present disclosure provide systems and methods that allow for incremental pitch spacing, such as in increments of less than 1".

While various spatial and directional terms, such as top, bottom, lower, mid, lateral, horizontal, vertical, front, forward, rearward, trailing and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A system for securing seats within a cabin of a vehicle, the system comprising:
    at least one seat fitting assembly including at least one seat-mounting member having at least one seat-connecting hole configured to receive at least one fastener that secures a portion of a vehicle seat to the at least one seat-mounting member, wherein the at least one seat-connecting hole is configured to be variably adjusted relative to the at least one seat fitting assembly between a plurality of mounting positions,
    wherein the at least one seat fitting assembly is configured to couple the vehicle seat to at least one seat track within the cabin of the vehicle.

2. The system of claim 1, wherein the plurality of mounting positions are separated by fractional distances.

3. The system of claim 2, wherein the fractional distances are less than 1".

4. The system of claim 1, wherein the at least one seat fitting assembly comprises first and second seat fitting assemblies, wherein the first and second seat fitting assemblies comprise first and second seat-mounting members, respectively, including first and second seat-connecting holes, respectively, wherein the first seat-connecting hole is located at a first location on the first seat-mounting member, wherein the second seat-connecting hole is located at a second location on the second seat-mounting member, wherein the first and second locations differ in relation to a respective central vertical axis of each of the first and second seat-mounting members.

5. The system of claim 4, wherein the at least one seat fitting assembly comprises third and fourth seat fitting assemblies, wherein the first and second seat fitting assemblies comprise third and fourth seat-mounting members, respectively, including third and fourth seat-connecting holes, respectively, wherein the third seat-connecting hole is located at a third location on the third seat-mounting member, wherein the fourth seat-connecting hole is located at a fourth location on the fourth seat-mounting member, wherein the first, second, third, and fourth locations differ in relation to the respective central vertical axis of each of the first and second seat mounting members and a different respective central vertical axis of each of the third and fourth seat-mounting members.

6. The system of claim 1, wherein the at least one seat fitting assembly comprises first and second seat fitting assemblies, wherein the first and second seat fitting assemblies comprise first and second seat-mounting members, respectively, including first and second seat-connecting holes, respectively, wherein the first seat-mounting member is located at a first distance from a trailing end of the first seat fitting assembly, wherein the second seat-mounting member is located at a second distance from a trailing end of the second seat fitting assembly, and wherein the first distance differs from the second distance.

7. The system of claim 6, wherein the at least one seat fitting assembly comprises third and fourth seat fitting assemblies, wherein the third and fourth seat fitting assemblies comprise third and fourth seat-mounting members, respectively, including third and fourth seat-connecting holes, respectively, wherein the third seat-mounting member is located at a third distance from a trailing end of the third seat fitting assembly, wherein the fourth seat-mounting member is located at a fourth distance from a trailing end of the fourth seat fitting assembly, and wherein the first, second, third, and fourth distances differ from one another.

8. The system of claim 1, wherein the at least one seat fitting assembly comprises first and second seat fitting assemblies, wherein the first and second seat fitting assemblies comprise first and second seat-mounting members, respectively, including first and second seat-connecting holes, respectively, wherein the first seat-mounting member is positioned at a first angle with respect to a first base, and wherein the second seat-mounting member is positioned at a second angle with respect to a second base, wherein the first angle differs from the second angle.

9. The system of claim 1, further comprising a plurality of inserts, wherein each of the plurality of inserts has one of a plurality of seat-connecting holes at a different position, wherein the at least one seat fitting assembly includes a single seat fitting assembly having a single seat-mounting member defining a channel configured to receive one of the plurality of inserts, wherein the plurality of inserts may be selectively inserted and removed from the channel.

10. The system of claim 1, wherein the at least one seat fitting assembly comprises a single seat fitting assembly having a plurality of targets spaced apart from one another, wherein each of the plurality of targets provides a target for forming the at least one seat-connecting hole.

11. The system of claim 1, wherein the at least one seat fitting assembly comprises a track-engaging base removably secured to a seat-engaging mount that includes the at least one seat-mounting member, wherein the seat-engaging mount is selectively movable in relation to the track-engaging base, wherein the track-engaging base is configured to be fixedly secured to the seat track.

12. The system of claim 1, wherein the at least one seat fitting assembly comprises at least one position code that indicates a mounting position of the at least one seat-connecting hole.

13. The system of claim 1, further comprising:
the at least one seat track having mounting openings regularly spaced at fixed distances; and
the vehicle seat that includes at least one attachment member that secures to the at least one seat track through the at least one seat fitting assembly.

14. A method for securing seats within a cabin of a vehicle, the method comprising:
variably adjusting at least one seat-connecting hole of at least one seat-mounting member of at least one seat fitting assembly relative to the at least one seat fitting assembly between a plurality of mounting positions,
wherein the at least one seat fitting assembly is configured to couple a vehicle seat to at least one seat track within the cabin of the vehicle.

15. The method of claim 14, wherein the plurality of mounting positions are separated by fractional distances that are less than 1".

16. A seat-securing system configured to be positioned within a cabin of an aircraft, the system comprising:
at least one seat track having mounting openings regularly spaced at fixed 1" distances;
at least one seat fitting assembly including at least one seat-mounting member having at least one seat-connecting hole, wherein the at least one seat-connecting hole is configured to be variably adjusted relative to the at least one seat fitting assembly between a plurality of mounting positions, wherein the plurality of mounting positions are separated by fractional distances that are less than 1"; and
an aircraft seat that includes at least one attachment member that secures to the at least one seat track through the at least one seat fitting assembly.

17. The system of claim 16, wherein the at least one seat fitting assembly comprises first, second, third, and fourth seat fitting assemblies, wherein the first, second, third, and fourth seat fitting assemblies comprise first, second, third, and fourth seat-mounting members, respectively, including first, second, third, and fourth seat-connecting holes, respectively, wherein the first seat-connecting hole is located at a first location on the first seat-mounting member, wherein the second seat-connecting hole is located at a second location on the second seat-mounting member, wherein the third seat-connecting hole is located at a third location on the third seat-mounting member, wherein the fourth seat-connecting hole is located at a fourth location on the fourth seat-mounting member, and wherein the first, second, third, and fourth locations differ in relation to a central vertical axis of each of the first, second, third, and fourth mounting members.

18. The system of claim 16, wherein the at least one seat fitting assembly comprises first, second, third, and fourth seat fitting assemblies, wherein the first, second, third, and fourth seat fitting assemblies comprise first, second, third, and fourth seat-mounting members, respectively, including first, second, third, and fourth seat-connecting holes, respectively, located at different positions with respect to first, second, third, and fourth bases, respectively.

19. The system of claim 16, further comprising a plurality of inserts, wherein each of the plurality of inserts has a seat-connecting hole at a different position, wherein the at least one seat fitting assembly includes a single seat fitting assembly having a single seat-mounting member defining a channel configured to receive one of the plurality of inserts, wherein the plurality of inserts may be selectively inserted and removed from the channel.

20. The system of claim 16, wherein the at least one seat fitting assembly comprises a track-engaging base removably secured to a seat-engaging mount that includes the at least one seat-mounting member, wherein the seat-engaging mount may be selectively moved in relation to the track-engaging base.

* * * * *